United States Patent [19]

Bush

[11] Patent Number: 4,486,657

[45] Date of Patent: Dec. 4, 1984

[54] PHASE-LOCK FIBER OPTIC INTERFEROMETER

[75] Inventor: Ira J. Bush, Orlando, Fla.

[73] Assignee: The United States of America as represented by the Secretary of the Navy, Washington, D.C.

[21] Appl. No.: 382,850

[22] Filed: May 27, 1982

[51] Int. Cl.$^3$ .............................................. G02B 5/14
[52] U.S. Cl. .................................. 250/227; 356/349; 367/149
[58] Field of Search .................. 73/655, 657; 367/149, 367/140; 250/227, 231 P, 231 R; 356/349; 350/96.14

[56] References Cited

U.S. PATENT DOCUMENTS

| 3,520,613 | 7/1970 | Chitayat | 356/106 |
| 3,635,562 | 1/1972 | Catherin | 356/112 |
| 3,697,887 | 10/1972 | Lee et al. | 350/160 |
| 4,162,397 | 7/1979 | Bucaro et al. | 73/655 |
| 4,320,475 | 3/1982 | Leclerc et al. | 367/140 |

OTHER PUBLICATIONS

Optical Society of America, Optics Letters, May 1980, vol. 5, No. 5, pp. 173–175, R. Ulrich, *Fiber Optic Rotation Sensing with Low Drift.*
*Temperature Stabilized Optical Waveguide Modulation,* Review of the Electrical Communication Laboratories, vol. 26, Nos. 9–10, 9–10/1978.
*Measurement of Sensitivity of Optical Fibers for Acoustic Detection,* J. A. Bucaro and T. R. Hickman, Applied Optics, vol. 18, No. 6, 3/15/79.
*Fibre Optic Sensors,* T. G. Giallorenzi, Optics and Laser Technology, 4/1981.
"Accurate Phase-Measurement System for Fiber-Optic Acoustic Sensor" by Ira Jeffrey Bush, Published in the Proceedings for the ASA Conference in Nov. 1980, Los Angeles.
"Fiber Optic Phase-Swept Phase-Lock Loop" by Jeff Bush, Abstract Distributed at the Mar. 3rd, 1980 Florida Chapter Meeting of the Optical Society of America.
"Acousto-Optic Sensor Development" by J. A. Bucaro and J. H. Cole Reprinted from Oct. EASCON 1979 Record pp. 572–580.

*Primary Examiner*—David C. Nelms
*Assistant Examiner*—Ernest Austin, II
*Attorney, Agent, or Firm*—Robert F. Beers; William T. Ellis

[57] ABSTRACT

A fiber optic acoustic sensing system for tracking a phase shift linearly over a wide range thereby allowing accurate tracking in the presence of temperature induced phase flucuation. In one embodiment, light from a laser is split and coupled into both legs of a fiber interferometer. One leg is phase modulated by the acoustic signal while the other leg is phase modulated by a first and a second piezoelectric cylinder modulators. The second modulator is driven at $\omega_m$ to effectively shift the acoustic information up in frequency into the sidebands of the carrier $\omega_m$. The light signals in the two legs are combined, detected, cross-correlated with the carrier $\omega_m$ to produce an error signal, and then low pass filtered. This filtered error signal is fed back to control the first modulator. The first modulator keeps the interferometer locked in phase by effectively cancelling out the phase produced by temperature and acoustic pressure flucuations. To effect this cancellation, the first modulator must inversely duplicate the phase shift thereby producing the desired output signal.

8 Claims, 5 Drawing Figures

PHASE-LOCK FIBER OPTIC INTERFEROMETER

BACKGROUND OF THE INVENTION

The present invention relates generally to the field of acoustic sensing, and more particularly to acoustic sensing by means of fiber optic interferometry.

Fiber optic interferometer acoustic sensors typically measure the acoustic signal in the presence of noise by the estimation of phase information produced in the interferometer. However, such estimation is difficult, especially in water, because the phase noise resulting from the thermal fluctuations experienced by the fiber is much greater than the phase shift which constitutes the acoustic signal. These thermal phase fluctuations are so large that they cause the acoustic signal (as seen from the interference signal from the interferometer) to fade in and out. Additionally, phase fluctuations arise due to laser cavity fluctuations and signal fading due to polarization rotation of the guided light. There are two general demodulation techniques used to eliminate this fading phenomenon and recover the acoustic signal from an optical fiber interferometer.

The first technique, referred to as the heterodyne-FM method, incorporates a Bragg cell in the reference leg of the interferometer to frequency shift the light. The light is shifted in frequency by an amount equal to the frequency of the driver of the Bragg cell (typically in tens of megahertz). The interference signal of the interferometer (that results from the Bragg cell in the reference leg) is a signal that has a carrier frequency equal to that of the driver of the Bragg cell. The acoustic signal will be seen as sidebands to the carrier frequency. Heterodyning simply shifts the signal (acoustic information and thermal noise) up in frequency so that it may be demodulated. The type of demodulation employed is an FM discriminator; i.e., the system is designed to demodulate a frequency-modulated signal. This type of detection scheme will effectively demodulate the acoustic signal but it lacks utility for a practical system to be deployed in an underwater acoustic environment in the following respects:

1. The Bragg cell used in this technique requires precise alignment to shift the optical frequency. This alignment requirement will present difficulties in system layout and implementation.

2. For FM demodulation, the oscillator of the Bragg cell must be extremely stable (to about 1 part in $10^7$) in frequency. Such stability requires sophistication and expense in the design of the oscillator.

3. The signal is phase modulated, but it is FM demodulated. A signal at 1000 Hz will be 100 times larger than one at 10 Hz. Accordingly, the system will demonstrate a sensitivity as a function of frequency and will be increasingly limited with decreasing frequency. Thus, FM detection for a PM signal is far from an optimum approach.

The second demodulation technique, referred to as the Homodyne phase-lock detection method, correctly demodulates the phase-modulated signal generated by the acoustic field; that is, it PM demodulates the signal. The demodulation of the signal is accomplished by general phase-lock techniques that use an optical detector as the phase comparator. The output of the detector is amplified (dc coupled), low pass filtered, and then sent to a device that stretches the reference fiber (the phase-lock feedback operation that keeps the interference beams in quadrature). In general, this type of system suffers many drawbacks, all in part due to the optical detector being used as the phase comparator. In this regard the optical detector is typically a square-law device and produces a dc component that is at least, if not more than, the same level as the ac (information) signal, regardless of whether the system is in quadrature or not. The phase-locked homodyne system is a dc-coupled system. For such a system to be effective, the loop gain must be substantial in order to minimize the phase error as necessary to enhance the accuracy of phase tracking. The dc component will also be amplified in this process. Thus, if the amplifier is not compensated with a dc offset at the input, it will saturate and will not be able to track the phase. This type of offset is easy to implement if the dc level at the output of the optical detector is constant. However, in a fiber optic system the optical detector output is subject to various fluctuation in the dc level. It should also be noted that any change in the dc level in a homodyne system also changes the ac level; although it is the change in the dc level that will act to throw the system off lock and cause the amplifier to saturate, resulting in the loss of signal.

For either heterodyne or homodyne systems, fluctuations in the dc level at the detector output which hinder the system operation may arise from the following:

1. Mechanical alignment problems in the optical components in the configuration. The single-mode fibers used in these configurations have a very small diameter (typically 5 μm), and any slight alteration of the alignment will result in an intensity fluctuation seen at the detector.

2. The intensity output of the source (laser) fluctuates.

3. Polarization rotation may occur in either of the legs of the interferometer. Another problem with the homodyne system is that optical detectors and sources exhibit 1/f noise. The detector output is a signal centered around 0 Hz; or, in other words, the carrier frequency of the phase-modulated signal is 0 Hz. This is the noisiest place in the spectrum to measure signals with the optical detector.

From the above, it can be seen that there are a variety of problems in current methods contemplated for measuring the acoustic signal with a fiber optic interferometer.

OBJECTS OF THE INVENTION

Accordingly, it is an object of the present invention to provide a fiber optic system that will measure acoustic signal in the presence of thermal phase noise, laser intensity fluctuations, and acute polarization rotation of the guided light.

It is a further object of the present invention to eliminate the fading phenomenon typically present in the demodulation of fiber optic interferometer signals.

It is a further object of the present invention to provide a unique technique of demodulation for acoustic phase modulated information from a fiber optic interferometer.

It is yet a further object of the present invention to provide a demodulation technique which permits operation in a region where detector 1/f noise and laser intermodulation noise is low.

It is a further object of the present invention to provide a demodulation technique for a phase modulated signal which allows amplitude stabilization techniques to be applied to prevent optical intensity fluctuations or acute polarization from alterating system dynamics.

Other objects, advantages, and novel features of the present invention will become apparent from the detailed description of the invention, which follows the summary.

SUMMARY OF THE INVENTION

Briefly, the above and other objects are accomplished by providing a fiber optic interferometer phase demodulation system comprising:

an optical interferometer including a sensor light propagating leg with a device therein for optically phase modulating light propagating therethrough in accordance with a modulating field;

a reference light propagating leg;

a first phase modulator disposed in one of the light propagating legs;

a source of light for propagation through the sensor and reference legs;

a device for applying a carrier frequency $\omega_m$ in one of the light propagating legs; and a device for recombining the beams after propagation through the sensor and reference legs;

a detector for generating an electrical signal proportional to the recombined beam from the recombining device;

a mixing device for mixing the carrying frequency $\omega_m$ with the output signal from the detector;

a low pass filter for filtering the output signal terms from the mixing device; and a circuit for feeding back the filtered signal output from the low pass filter to control the first phase modulator.

In one embodiment, the carrier applying device comprises a second phase modulator disposed in one of the light propagating legs and driven by an oscillator signal at the frequency $\omega_m$.

In a second embodiment, the carrier applying device comprises a Bragg cell driven by a voltage signal at the frequency $\omega_m$ for generating from the source of light two optical beams with frequencies differing by the frequency $\omega_m$, spatially removed from each other, for application to the sensor and reference legs, respectively.

In a third embodiment, the carrier applying device comprises a summing circuit for adding a voltage signal at a frequency $\omega_m$ to the filtered output signal being fed back to the first phase modulator by the feedback circuit.

In essence, the insertion of a carrier frequency into the reference leg effectively shifts the acoustic information at the detector output up in frequency into the sidebands of the carrier frequency $\omega_m$. The shifting of the signal up in frequency has the advantage that amplitude stabilization techniques may be utilized and it permits operation of the detector in a region where the 1/f noise and laser intermodulation noise is low.

The feedback signal serves the dual purpose of keeping the interferometer locked in phase and producing the demodulated output signal. In essence, the operation of the feedback modulator in the reference leg effectively cancels out the phase produced by temperature and acoustic pressure fluctuations by inversely duplicating it. Thus, this duplication produces an output signal that is linearly proportional to the phase of the interferometer.

DETAILED DESCRIPTION OF THE PREFERRED EMBODIMENT

The present system relates to the interferometric detection of optical phase. Such interferometer systems generally operate by splitting a single laser frequency beam into two beams via a beamsplitter. One beam propagates along a signal leg or sensor leg, while the other beam propagates through a reference leg. The sensor leg is disposed in some form of modulating field and experiences optical phase modulation, while the reference leg maintains a constant optical phase. This optical phase modulation of the sensor leg will be proportional to the modulating force on the sensor leg. The two optical beams are recombined in a second beamsplitter and the interference pattern is detected with an optical detector. If assumptions of co-linear, planewave propagation, and non orthogonal polarizations for the recombined beams are made, it is an established fact that the output of the detector (current or voltage response) produces a signal, s(t), that is proportional to the relative optical phase difference between the signal and the reference leg of the interferometer. However, the measurement of this output phase fluctuation is inhibited by the phase noise of the system. This phase noise consists primarily of (1) phase noise produced by acoustic background noise; (2) phase noise produced by a path length mismatch resulting in a loss of coherence; and (3) most importantly, phase noise resulting from temperature fluctuations. The present system is a closed loop system specifically directed at sensing phase fluctuations in the presence of such phase noise. The system operates on the principle of feeding back an error signal to a phase shifter in one of the light propagating legs of the interferometer to maintain synchronization or phase lock to the signal leg.

Figure 1:
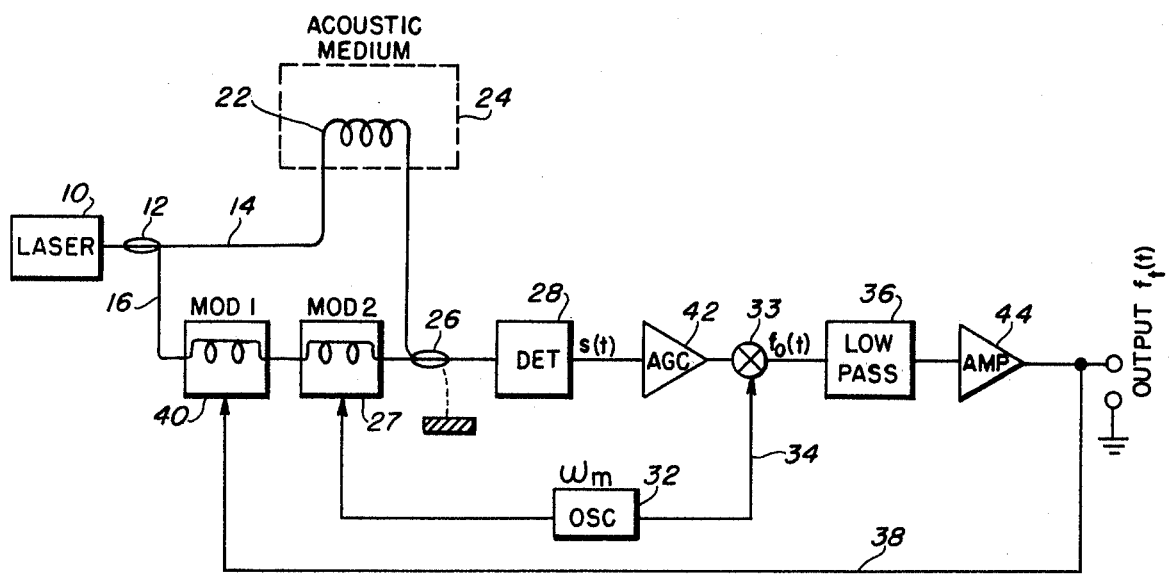
FIG. 1 is a schematic block diagram of one embodiment of the present invention.

Referring now to the drawings, wherein like reference characters designate like or corresponding parts throughout the views, FIG. 1 shows one embodiment of the present invention. The interferometer of the present system comprises an optical-fiber sensor light propagating leg 14 and an optical-fiber reference light-propagating leg 16. A light source such as a laser 10 directs its light to a beamsplitter 12 wherein the light is split into two beams which propagate through the optical-fiber sensor leg 14 and the optical-fiber reference leg 16 of the interferometer. A section 22 of the optical fiber sensor leg 14 may be wound in the shape of a coil and disposed in a modulating field such as, for example, an acoustic medium 24 in order to sense acoustic field fluctuations. Typically, this coil of fiber is from 10 to 100 meters in length and is rolled up so that it is compact enough to be much smaller in diameter than the acoustic wavelengths of interest. The reference leg is generally composed of a piece of optical fiber as long as the sensor leg in order to match the optical path length of the sensor leg. The optical beams from these two legs are then recombined by a beamsplitter 26 to produce an interference pattern on a detector 28. Typically, the light propagating in such a fiber system is of a single frequency and a single mode (HE $_{11}$).

It should be noted that in FIG. 1, the entire interferometric system has been realized using optical fibers with evanescent couplers utilized as the beamsplitters. Thus, the lines beginning at the laser 10 and proceeding through the legs 14 and 16 to the detector 28 may be formed of optical fibers. However, it is possible to also realize the system with discrete beamsplitters with their attendant lenses disposed to couple light to and from the optical fiber legs 14 and 16.

One of the features of the present invention is the shifting of the acoustical phase information up in frequency into the sidebands of a carrier frequency $\omega_m$ and harmonics thereof. Since the acoustic phase information is shifted up in frequency into sidebands of the carrier, signal amplitude can be stabilized by using an ac coupled automatic gain control amplifier following the detector. Moreover, this frequency shifting greatly reduces the detector 1/f noise and the laser intermodulation noise from the signal. In order to accomplish this frequency shifting, a phase modulator is disposed in one of the light propagating legs of the interferometer. Although the phase modulator 27 is disposed in the reference leg 16 of the interferometer for purposes of illustration and convenience, it should be noted that it may be disposed in either leg of the interferometer. The phase modulator 27 may be driven by an oscillator 32 in accordance with the oscillator output signal frequency $\omega_m$. By way of example, the phase modulator 27 may be formed from a length of fiber wrapped around a thin-walled piezoelectric cylinder. This modulator induces an optical phase shift resulting from an electro-mechanical radial displacement of the cylinder. Generally, the phase modulator 27 is sinusoidally driven at $\omega_m$ to produce a phase modulated signal with a sufficient depth of modulation to produce phase excursions that exceed $\pi$ radians in order to utilize the full contrast of the interference signal produced by the interferometer.

The combined beams at the coupler 26 including the carrier component $\omega_m$ are applied to the detector 28. The detector 28 is a "square law" detector and will act to generate an electrical signal proportional to the interference intensity pattern focused on its detecting face.

This electrical signal s(t) from the detector 28 is then cross-correlated to a reference signal at the carrier frequency $\omega_m$. This cross-correlation is accomplished by multiplying the signal s(t) with the oscillator voltage output signal at the carrier frequency $\omega_m$ on the line 34. This multiplication of sinusoids will produce sinusoids at the sum and difference frequencies of the two input signals. Accordingly, a plurality of sum and difference terms will be present at the output of the mixer 33. This output signal from the mixer 33 is then applied through a low pass filter 36 with its upper cut-off frequency $\omega_c$ (−3 dB) much less than the frequency $\omega_m$. Thus, it can be seen that all of the sum and difference terms will be greatly attenuated except for the lowest frequency term or portion of the cross-correlated signal. This filter signal is then fed back to control the phase modulation in one of the light propagating legs in the interferometer. This filter signal is considered to be an error feedback signal and serves the dual purpose of keeping the interferometer locked inphase and producing the demodulated output signal. In essence, this signal keeps the interferometer locked inphase by effectively cancelling out the phase produced by the temperature and acoustic pressure fluctuations. However, in order to cancel out this phase, the modulation must inversely duplicate it, thus producing the desired output signal that is linearly proportional to the phase of the interferometer.

It should be noted that there are a variety of methods of feeding back this filtered signal to control the phase modulations in one of the legs of the interferometer. In the embodiment disclosed in FIG. 1, the filtered signal from the low pass filter 36 is applied via the line 38 to a phase modulator 40 disposed in the reference leg 16 of the interferometer. Again, note that this positioning of the phase modulator 40 in the reference leg is for purposes of illustration only, and the modulator may be placed in either leg 14 or leg 16 of the interferometer. Although there are a variety of phase modulating devices which could be utilized to realize the phase modulator 40, the modulator 40 in FIG. 1 has again been conveniently realized by wrapping a fiber around a thin-walled piezoelectric cylinder. It should be noted that if these piezoelectric devices 27 and 40 are operated at frequencies well below their resonant frequency, they may be modeled as linear devices exhibiting a linear relationship between the applied voltage and the induced optical phase shift.

The system disclosed accomplishes phase-lock by comparing the phase of the interferometer signal from the detector to the phase of the carrier signal $\omega_m$ (via the multiplication at the mixer 33), and producing an error signal at the output of the mixer 33. This error signal is linearly proportional to the phase of the interferometer and is the desired output signal.

It should be noted that an automatic gain control circuit 42 has been disclosed between the detector 28 and the mixer 33 in order to stabilize the response of the system. Additionally, an amplifier 44 may be disposed after the low pass filter 36 as shown in FIG. 1 to both amplify the signal and effect further stabilization of the system.

In order to provide a better understanding of the operation of the present invention, a brief description of a first-order, linear approximation to the operation of the present system will be described beginning with the output at the detector 28. It is well known that the detector output is proportional to the absolute value of the square of the sum of the signals from both legs of the interferometer. The output of the optical square-law detector may be described by the following equation:

$$s(t) = K[E_r^2 + E_s^2 + 2E_r E_s(\cos(\theta_s(t) + \theta_n(t) - \phi_m(t) - \theta_m(t))]$$

where
$E_r$ = dc electric field amplitude for the reference leg
$E_s$ = dc electric field amplitude for the sensor leg
$\theta_s(t)$ = phase shift modulation from the acoustic field to be measured.
$\theta_n(t)$ = noise-induced phase shift
$\phi_m(t)$ = phase shift that results from the voltage applied to phase modulator 40 in the feedback loop and any static terms.
$\theta_m(t)$ = phase shift produced by the phase modulator 27 to generate the carrier $\omega_m$ at the detector and may be represented by the expression $\theta_m = \beta \sin \omega_m t$.

For the case of an acoustic sensor, $\theta_n$ will essentially take on the value of $\theta_{nT}$ (the temperature-induced phase shift.) The phase terms may be lumped together as follows:

$$\theta_i + \theta_{nT} - \phi_m = \phi_i - \phi_m = \phi_e \tag{2}$$

Since we are only interested in the ac component of the detector interference pattern s(t), we may write $$s(t)_{ac} = 2E_r E_s K \cos(\beta \sin \omega_m t - \phi_e) \tag{3}$$

This expression may be rewritten with the aid of trigonometric identities and rearranged as follows.

$$s(t)_{ac} = 4KE_r E_s (J_1(\beta)\sin\phi_e)\sin\omega_m t + \tag{4}$$
$$(J_2(\beta)\cos\phi_e)\cos 2\omega_m t + (J_3(\beta)\sin\phi_e)\sin 3\omega_m t +$$
$$(J_4(\beta)\cos\phi_e)\cos 4\omega_m t + \ldots$$

where $J_k(X)$ represents a Bessel function of the first kind of order K and argument X.

The mixer 33 then acts as a multiplier with inputs s(t) and $\sin \omega_m t$. Since the multiplication of sinusoids produces sinusoids at the sum and difference frequencies of the input, a plurality of sum and difference frequencies $\sin(n\omega_m \pm \omega_m)t$ will be created. However, since the cutoff frequency $\omega_c$ (−3 dB point) for the low pass filter is chosen such that $\omega_m >> \omega_c$, then it is clear that the only significant term in $s(t)_{ac}$ that will be passed by the filter is the first term in equation 4, or $$s(t)_{eff} = 4KE_r E_s J_1(\beta)\sin\phi_e \sin \omega_m t. \tag{5}$$

Incorporating the same filter assumptions as before ($\omega_m >> \omega_c$) the effective output signal from the mixer 33 is $$f_o(t)_{eff} = G_1 \sin \phi_e \tag{6}$$

where $G_1 = 2E_r E_s K J_1(\beta) K_1$. The factor $K_1$ has been included to represent the gain of the AGC 42 and amplifier 44. Equation (6) represents the result of the feedback system duplicating the phase of the signal s(t) to ensure quadrature components at the inputs to the mixer phase comparator. It can be seen that when the system is in phase lock, $\phi_e$ will become small and the well-known approximation can be made that $$\sin \phi_e = \phi_e.$$

Thus, the output and feedback signal will be $$f(t) = G_1 \phi_e$$

or making the substitution from equation (2)

$$F(t) = G_1(\theta_i + \theta_{nT} - \phi_m)$$

When the system acquires phase lock, it forces the feedback phase shift $\phi_m$ to effectively duplicate $\theta_i + \theta_{nT}$ with an opposite sign. The feedback phase $\phi_m$ will never completely cancel $\theta_i + \theta_{nT}$ and the result will be the error signal $\phi_e$. The magnitude of $\phi_e$ will be determined by the system open loop gain. It can be shown with mathematical rigor that the signal when in phase lock is equal to $$f(t) = G_1\gamma(\theta_i + \theta_{nT}) \approx G_1 \phi_e$$

where $\gamma$ is generally a small value ($|\gamma| << 1$). It is evident that the demodulated output replicates the acoustic information and the thermal phase noise. However, the thermal phase noise can be easily removed since it is limited in bandwidth to very low frequencies, typically 1 Hz or lower.

Figure 2:
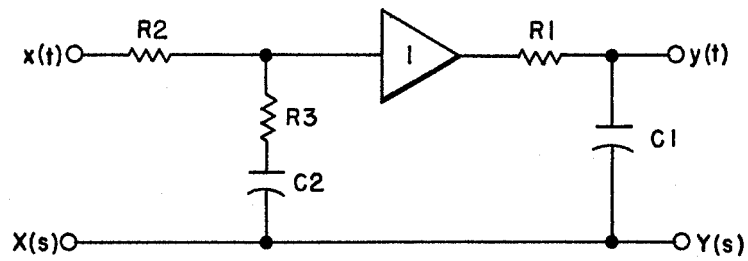
FIG. 2 is one embodiment of a low pass filter which could be utilized in the circuit of FIG. 1.

A preferred low pass filter design is shown in FIG. 2. This low pass design will allow significant flexibility in controlling the loop gain and damping ratio. The filter shown in FIG. 2 is commonly referred to as a lag-lead filter and provides a certain amount of shunt resistance in one of the single pole filters. The transfer function for this filter may be written as follows:

$$L(s)_c = K\lambda_1(s+\lambda_3)/(s+\lambda_1)(s+\lambda_2)$$

where
$\lambda_1 = 1/R_1 C_1$
$\lambda_2 = 1/(R_2 + R_3) C_2$
$\lambda_3 = 1/R_3 C_2$
$K = \lambda_2/\lambda_3$.

The poles and zeros for this transfer function will be chosen to maintain system stability.

Figure 3:
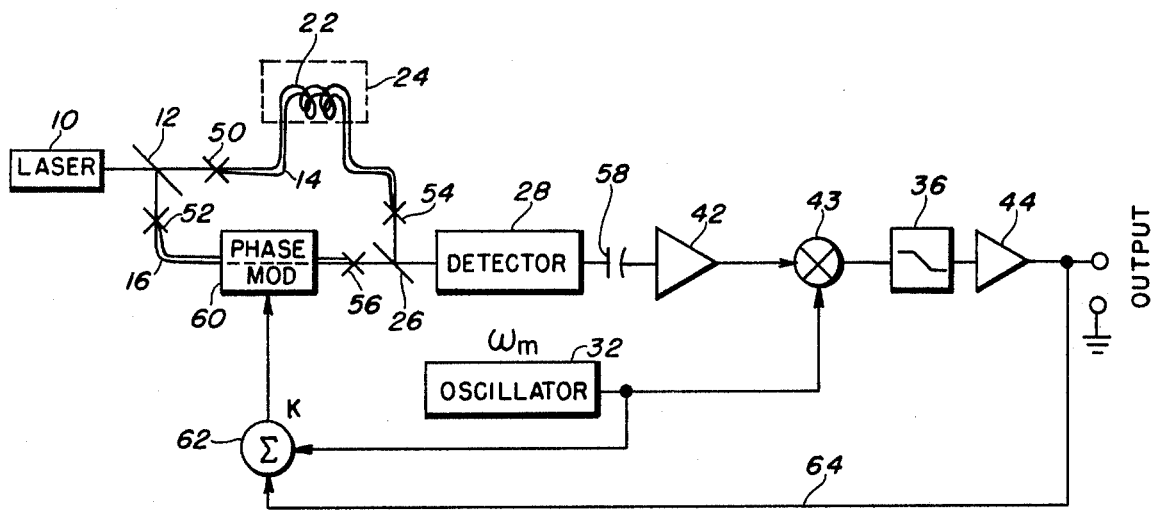
FIG. 3 is a schematic block diagram of a second embodiment of the present invention utilizing a single phase modulator and a summing circuit in the driving circuit therefor to add a carrier to the system.

Referring now to FIG. 3, there is disclosed a second embodiment of the present invention. For purposes of illustration only, the interferometer is shown as being formed from discrete beamsplitters 12 and 26. Beamsplitter 12 operates directly on the laser beam from the laser 10. Accordingly, there must be some form of optics to couple this beam into the optical fibers for the sensor leg 14 and the reference leg 16. These optics are illustrated in FIG. 3 by the X's 50 and 52 and 54 and 56 and may represent a lens or some form of evanescent field coupler. Accordingly, the open air light beams split at the beamsplitter 12 are focused or coupled into the optical fibers 14 and 16 by the couplers 50 and 52, respectively. Likewise, the light beams propagating in the sensor leg 14 and the reference leg 16 are focused onto the recombining beamsplitter 26 by the couplers 54 and 56, respectively. It should again be noted that this system could have been illustrated entirely with evanescent coupler and optical fibers without the need for open air light paths or discrete beamsplitters.

It should be noted that a capacitor 58 has been inserted in the loop after the detector 28 and before the mixer 43. This capacitor has been inserted merely to illustrate the fact that it is the ac component of the detected interference signal s(t) which is being utilized in the circuit.

The primary difference between FIG. 1 and FIG. 3 is the fact that only a single phase modulator 60 is utilized to apply a carrier frequency modulation $\omega_m$ and the feedback signal phase modulation to the interferometer output. The purpose of this modulation is to add both the carrier frequency $\omega_m$ and the feedback phase modulation into the detected interference pattern at the detector 28. Accordingly, as noted previously, this modulator may be located in either leg of the interferometer. In order to apply a signal representative of the two phase modulations to the phase modulator 60, a voltage signal at the frequency $\omega_m$ from the oscillator 32 is applied to one input of a summing amplifier 62. The amplified output signal from the amplifier 44 is applied via the line 64 to a second input of the summing amplifier 62. The amplifier 62 sums these two modulation signals and applies the resultant signal to control the phase modulator 60. The phase modulator 60 is shown for purposes of illustration only, in the reference leg 16 of the interferometer. This configuration provides the same basic result as the configuration shown in FIG. 1. It should be noted that this configuration was actually set up in the laboratory to demonstrate the concept of the phase locking system. The light source utilized was a Spectra physics model 124 helium neon laser and the optical fiber utilized was ITT-T110 single-mode fiber. Although no special care was taken to optimize parameters such as thermal noise, sixty cycle interference, or the path lengths of the legs of the interferometer, the system still exhibited a minimum detectable phase shift of $1 \times 10^{-5}$ radians for a signal-to-noise ratio of 1 Hertz band. With optimization, it is expected that this system will be able to detect in the range of $1 \times 10^{-6}$ radians. In essence, it has been verified that the present system has a linear tracking range of $\pm 900$ radians.

Figure 4:
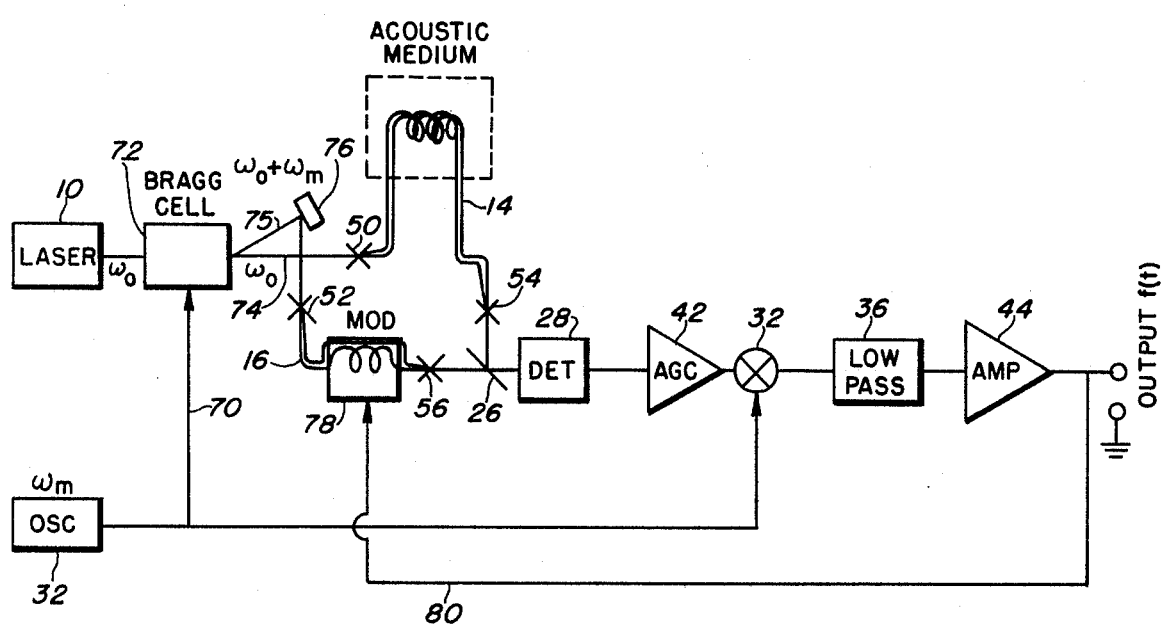
FIG. 4 is a third embodiment of the present invention utilizing a Bragg cell to add a carrier to the system.

Referring now to FIG. 4, there is disclosed a third embodiment of the present invention utilizing a Bragg diffractor. The primary difference between this configuration and the previously disclosed configurations is in the use of an electro-optic modulator, in this case a Bragg diffractor, to produce two optical beams with frequencies differing by the frequency $\omega_m$ spatially removed from each other. Accordingly, the electro-optic modulator is utilized to insert the carrier frequency $\omega_m$ into the detected interference pattern at the detector 28. Thus, there is no need for a phase modulator 40 as in FIG. 1 or the need for a summing amplifier 62 to add the carrier frequency with the feedback signal for application to a modulator 60 as shown in FIG. 3.

Bragg cells are well known in the art and will not be discussed at length. Briefly, a piezoelectric transducer is driven by a modulating frequency to produce a single ultrasonic wave at that frequency which is then coupled into an isotropic homogeneous interaction medium. The effect that this traveling wave has on the interaction medium is that of a sinusoidally varying index distribution and may be conceptualized with the analogy of the device being a dynamic diffraction grating which doppler shifts the diffracted light. A commonly used transducer to produce the ultrasonic signal is lithium niobate: a common diffraction interaction medium is lead molybdate. In FIG. 4, the Bragg cell 72 has its index distribution varied sinusoidally in accordance with the carrier frequency from the oscillator on line 70. Thus, when a light beam from the laser 10 is directed at the Bragg cell 72, it is propagated through a sinusoidally varying index distribution. The result is the generation of two frequencies with a frequency difference of $\omega_m$. The frequency $\omega_o$ (the laser frequency) is directed on line 74 to the coupler 50 for coupling into the sensor leg 14. The frequency $\omega_o + \omega_m$ on the line 75 which is applied to a reflecting device 76 is at a different angle from the line 74. The reflecting device 76 reflects the signal $\omega_o + \omega_m$ to the coupler 52 which directs the signal on to the optical fiber of the reference leg 16. By this method, a carrier frequency $\omega_m$ has been inserted into the interferometer without the need for phase modulation. Thus, only a single phase modulator 78 is disposed in one of the light propagating legs of the interferometer and is driven by the filtered feedback signal on the line 80 in order to achieve phase-lock. It is again noted, that the phase modulator 78 may be disposed in either leg of the interferometer, but is shown, for purposes of illustration, in the reference leg 16 of the interferometer.

The presently disclosed system has a variety of advantages over previously mentioned prior art systems. In particular, in comparison to the homodyne system, the present invention has the following advantages: (1) the use of a carrier signal allows ac coupling at the output of the optical detector. Such coupling permits the mixer to function as the cross-correlator or phase comparator as opposed to utilizing the optical detector for this phase comparison function in the homodyne system. Moreover, the ac coupling of the system eliminates the non-information carrying dc term that is present in the homodyne system. (2) The use of a carrier to shift the acoustic information up in frequency permits system operation in a region where the detector 1/f noise and laser intermodulation noise is low. Additionally, the use of such a carrier allows amplitude stabilization techniques such as clipping or AGC circuitry to be applied without the loss of information. This clipping or AGC operation renders the system insensitive to intensity fluctuations arising from polarization rotation and intensity fluctuations seen at the optical detector.

The present system has the following specific advantages over the heterodyne-FM systems: (1) the present system is much simpler than the heterodyne-FM system in terms of optical alignment problems and frequency stabilization. Additionally, the frequency of the Bragg cell used in such heterodyne systems must be extremely stable (probably to one part in $10^7$). Accordingly, systems utilizing a Bragg cell are limited to certain applications. In contra-distinction the oscillator in the present system requires very little frequency stabilization. This reduction of the need for frequency stabilization is due to the fact that the same oscillator that is used to generate a carrier signal is also used to mix the signals for cross-correlation, thereby eliminating phase mismatch between the two inputs to the mixer. (3) Finally. it is noted that the present phase-lock system demodulates phase-modulated signals while the heterodyne system uses FM demodulation.

In essence, the present disclosure describes and models a synchronous detection system for detecting phase in an optical interferometer. This system operates linearly, has the ability to function independently of large fluctuations in $E_r$ and $E_s$, and exhibits a large dynamic range. Thus, the present system has the ability to operate accurately in the presence of thermal fluctuations, laser intensity fluctuations, and acute polarization rotation of the guided light.

Figure 5:
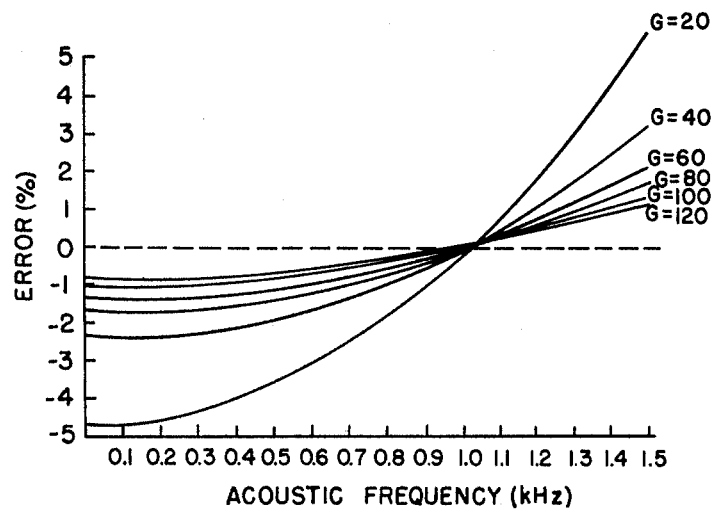
FIG. 5 is a graph of the system error percentage vs. acoustic frequency.

FIG. 5 shows the calculated measurement error $\phi_e$ of the system as a function of acoustic frequency for various feedback gains G. It can be seen that the error decreases as G is increased.

Obviously many modifications and variations of the present invention are possible in light of the above teachings. It is therefore to be understood that within the scope of the appended claims the invention may be practiced otherwise than as specifically described.

What is claimed and desired to be secured by Letters patent of the United States is:

1. An optical interferometric sensor system for accurately measuring acoustic phase shift in the presence of noise comprising:
   an optical interferometer including
      a light source;
      a sensor light propagating leg with means therein
         for optically phase modulating light propagating therethrough in accordance with an acoustic pressure field;

a reference light propagating leg;

a first phase modulator disposed in one of said light propagating legs;

a second phase modulator disposed in one of said light propagating legs;

means for splitting light from said light source and coupling the split light beams to propagate through said sensor and reference legs; and means for recombining the beams after propagation through said sensor and reference legs;

a detector for generating an electrical signal proportional to the recombined beam from said recombining means;

an oscillator for generating a voltage signal at a carrier frequency $\omega_m$ and applying said signal to control said second phase modulator;

means for mixing said carrier frequency signal $\omega_m$ with the output signal from said detector;

a low pass filter for filtering the output signal terms from said mixing means; and means for feeding back the filtered output from said low pass filter to control said first phase modulator.

2. An optical interferometric sensor system for accurately measuring phase shift in the presence of noise comprising:

an optical interferometer including;

a sensor light propagating leg with means therein for optically phase modulating light propagating therethrough in accordance a modulating field;

a reference light propagating leg;

a first phase modulator disposed in one of said light propagating legs;

a source of light beams for propagation through said sensor and reference legs;

means for applying a carrier frequency $\omega_m$ to one of said light propagating legs; and means for recombining said beams after propagation through said sensor and reference legs;

a detector for generating an electrical signal proportional to the recombined beam from said recombining means;

means for mixing the carrier frequency $\omega_m$ with the output signal from said detector;

a low pass filter for filtering the output signal terms from said mixing means; and means for feeding back the filtered signal output from said low pass filter to control said first phase modulator.

3. An optical interferometric sensor system as defined in claim 2, wherein said carrier applying means comprises:

a second phase modulator disposed in one of said light propagating legs and driven by said oscillator voltage signal.

4. An optical interferometer sensor system as defined in claim 2, wherein said carrier applying means comprises:

a Bragg cell driven by a voltage signal from an oscillator for generating from the light from said source of light two optical beams with frequencies differing by $\omega_m$ spatially removed from each other, for application to said sensor and reference legs, respectively.

5. An optical interferometric sensor system as defined in claim 2, wherein said phase modulator is a piezoelectric cylinder.

6. An optical interferometric sensor system as defined in claims 3 or 4, further including an automatic gain control amplifier operating on the output signal from said detector and then applying its output signal to said mixing means, and wherein said reference and sensor legs are formed in part, from optical fibers.

7. An optical interferometer sensor system as defined in claim 2, wherein said carrier applying means comprises a summing circuit for adding a voltage signal at a frequency $\omega_m$ from said oscillator to the filtered output signal being fed back to said first phase modulator by said feeding back means.

8. An optical interferometric sensor system for accurately measuring acoustic phase shift in the presence of noise comprising:

an optical interferometer including a light source;

a sensor light propagating leg with means therein for optically phase modulating light propagating therethrough in accordance with an acoustic pressure field;

a reference light propagating leg;

a phase modulator disposed in one of said light propagating legs;

means for splitting light from said light source and coupling the light beams to propagate through said sensor and reference legs; and means for recombining the beams after propagation through said sensor and reference legs;

a detector for generating an electrical signal proportional to the recombined beam from said recombining means;

an oscillator for generating a voltage signal at a carrier frequency $\omega_m$;

means for mixing said carrier frequency signal from said oscillator with the output signal from said detector;

a low pass filter for filtering the output signal terms from said mixing means;

means for summing the filtered output from said low pass filter with a voltage signal at the carrier frequency $\omega_m$ from said oscillator; and means for applying the output signal from said summing means to control said phase modulator.

* * * * *